United States Patent Office

3,642,735
Patented Feb. 15, 1972

3,642,735
RAPIDLY CRYSTALLIZING VINYLIDENE CHLORIDE-ACRYLONITRILE COPOLYMER PREPARED IN THE PRESENCE OF CERIC SALT/ALCOHOL INITIATOR FOLLOWED BY STEPS OF HEATING AND COOLING
Dudley Gibson Woodard, Columbia, Md., assignor to W. R. Grace & Co., Clarksville, Md.
No Drawing. Filed Feb. 5, 1970, Ser. No. 9,045
Int. Cl. C08f 15/06, 15/22
U.S. Cl. 260—85.5  10 Claims

ABSTRACT OF THE DISCLOSURE

Vinylidene chloride-acrylonitrile copolymers having an acrylonitrile content of up to about 20 percent by weight, are rapidly crystallizing when prepared using a combination ceric salt-organic alcohol initiator. Diol alcohols are the preferred alcohol species and yield the better results. These copolymers may also contain a stabilizer.

BACKGROUND OF THE INVENTION

This invention relates to a rapidly crystallizing vinylidene chloride-acrylonitrile copolymer having an acrylonitrile content of up to 20 percent. This invention further relates to a method of producing rapidly crystallizing vinylidene chloride-acrylonitrile copolymers having an acrylonitrile content of up to 20 percent by weight by polymerizing the monomer composition using a mixture of a ceric salt and an organic alcohol as the initiator.

Homopolymers of vinylidene chloride have not found much practical use. These polymers, although generally highly crystalline, are brittle, have poor impact resistance, and are unstable, giving off hydrogen chloride and changing in color and other physical properties. Known stabilizers inhibit some of this change, but non completely or substantially completely eliminate hydrogen halide evolution and discoloration. This fact of gradual deterioration of the polymer prevents successful commercial use. The art in order to surmount these problems uses instead copolymers of vinylidene chloride with vinyl chloride, esters of acrylic and methacrylic acid, acrylonitrile and various vinyl esters and ethers. In using copolymers of vinylidene chloride, in order to get optimum benefit of the vinylidene chloride, the content of the added monomer must remain within the range wherein there will still be crystallization. Vinylidene chloride as a homopolymer is highly crystalline, but as a monomer such as acrylonitrile is added, the degree of crystallinity decreases, so that at acrylonitrile concentrations of greater than about 8 percent by weight, the copolymers produced are substantially amorphous. Some of these copolymers can be crystallized, but long periods of annealing are required. The present invention provides a method whereby a rapidly crystallizing vinylidene chloride-acrylonitrile copolymer can be formed using the mixture of a ceric salt and organic alcohol as the initiator. By this method, copolymers having an acrylonitrile content of up to 20 percent are rapidly crystallizing.

The property of rapid crystallization is important to many copolymer applications, since structural and barrier properties are highly dependent on this property. In container extrusion, it is important to rapidly crystallize so that the formed container will maintain its shape. If on extrusion the copolymer remains amorphous, the container will change shape under the influence of gravity while cooling. In the formation into a wrap film, rapid crystallization yields films which are heat shrinkable and allows the use of the bubble technique in the manufacture of film. Further, these are good barrier films since crystallization reduces the permeability of the film. In general, for any use where a plastic article is made to a shape which is to be maintained, it is most desirable that it be constructed of a rapidly crystallizing polymer or copolymer.

In regard to the prior art, ceric salts in combination with organic alcohols have been used as vinylidene monomer polymerization initiators. U.S. Pat. 2,922,768 discloses the use of ceric salts in combination with alcohols as vinylidene monomer polymerization initiators. However, the technique of copolymerizing vinylidene chloride with acrylonitrile, and the unexpected result of rapid crystallization is not disclosed. In the present invention, it has been found that using ceric salts and an organic alcohol as the initiator yields a rapidly crystallizing vinylidene chloride-acrylonitrile copolymer. This effect of rapid crystallization is specific to this initiator system and does not occur when the initiator is hydrogen peroxide, potassium, or ammonium persulfate, benzoyl peroxide or azobis isobutyronitrile. Copolymers produced using these other initiators are either amorphous or crystallize slowly.

It is an object of this invention to produce rapidly crystallizing vinylidene chloride-acrylonitrile copolymers whereby the optimum benefit of the ability of vinylidene chloride to rapidly crystallize is maintained while the properties of brittleness and poor impact resistance are dissipated by the addition of large amounts of acrylonitrile.

It is also an object of this invention to set out a method whereby rapidly crystallizing vinylidene chloride-acrylonitrile copolymers are produced wherein the acrylonitrile content ranges up to about 20 percent by weight.

It is further an object of this invention to set out the ordered sequence of addition of the ceric salt-organic alcohol initiator to produce rapidly crystallizing vinylidene chloride-acrylonitrile copolymers.

BRIEF SUMMARY OF THE INVENTION

This invention comprises a highly crystalline vinylidene chloride-acrylonitrile copolymer. This invention further comprises a method of producing a rapidly crystallizing vinylidene chloride-acrylonitrile copolymer having an acrylonitrile content of up to 20 percent by polymerizing the vinylidene chloride monomer and acrylonitrile monomer, using a ceric salt-organic alcohol initiator system. In order to effect rapid crystallization, this initiator system must be added during copolymerization, since a subsequent addition will not yield a rapidly crystallizing vinylidene chloride-acrylonitrile copolymer.

DETAILED DESCRIPTION OF THE INVENTION

More specifically, this invention comprises the phenomenon of rapid crystallization. This is the result of some ordering induced during copolymerization. After copolymerization, when this vinylidene chloride-acrylonitrile copolymer is heated to its crystalline melting point and cooled, the copolymer rapidly crystallizes during cooling. This occurs even though the acrylonitrile content is up to 20 percent by weight of the copolymer. This phenomenon does not occur when other initiators are used; when the crystalline melting point is exceeded by more than 30° C. during melting, or if the ceric salt-organic alcohol initiator system of this invention is added at any time after the copolymerization of the vinylidene chloride-acrylonitrile.

The vinylidene chloride-acrylonitrile copolymers of the present invention are preferably produced by suspension or emulsion techniques. The monomers are preferably in a concentration relationship of from about 5 to 20 weight percent of acrylonitrile. Higher concentrations of acrylonitrile with respect to vinylidene chloride are copolymerized using this ceric salt-organic alcohol initiator system, but they are not what is considered as rapidly crystallizing. There is, however, some crystallization in such copolymers and further crystallization may be induced by annealing. The initiator of this invention must consist of a ceric salt and an organic alcohol. The preferred ceric salts are potassium nitrato cerate, ammonium nitrato cerate, ammonium sulfato cerate, nitrato ceric acid, ceric iodate, ceric hydroxide and ceric oxide. Other ceric salts such as ceric nitrate and ceric sulfate are also useful to a degree, but these are not preferred salts.

The preferred organic alcohols for use with the ceric salts include 1,4-cyclohexanedimethanol, 1,6-hexanediol, 1,3-propylene glycol, diethylene glycol, dipropylene glycol, glycerol, cyclohexanol, cyclohexane methanol, ethylene glycol and $\alpha,\alpha$:paraxylenediol. Other organic alcohols are useful to varying degrees, but in general are not as effective as these preferred species. Mixtures of these organic alcohols and/or of the ceric salts may also be used.

The concentration of initiator to vinylidene chloride and acrylonitrile monomers is in the range of from 5 percent to 15 percent by weight. The constitution of the initiator itself is essentially from about 10 percent to 20 percent by weight of ceric salt to 90 percent to 80 percent by weight of the organic alcohol. Water is the reaction media, with the water concentration not a critical factor. An emulsifying agent is added in a concentration of about 2 percent by weight of the water concentration. The purpose of the emulsifier is to solubilize the reactants. The preferred emulsifier is sodium lauryl sulfate, but others known in the art of emulsion polymerization may be used.

The copolymerization reaction is conducted in an oxygen free atmosphere. Prior to addition of the monomers, the reaction vessel is swept with an inert gas such as nitrogen, argon, carbon dioxide or the like; or the vessel can contain a piece of Dry Ice which on addition of the water will form carbon dioxide and purge the vessel. The order of reactant addition is not critical, except that the monomers are preferably added last. The preferred order of addition is that of water, emulsifier and ceric salt, alcohol and the monomers. During addition of the monomers, the vessel is maintained at from 30° C. to about 40° C. The copolymerization reaction is exothermic, and after initiation it will generally maintain the reaction temperature. If necessary, heating may be maintained. On completion of copolymerization, the copolymer is removed, dried and analyzed for birefringence. The copolymer is then heated to its crystalline melting point, but not more than 30° C. greater than the crystalline melting point, and cooled. The rate of cooling is not critical. On cooling 10° C.–20° C. below the crystalline melting point, these copolymers rapidly crystallize, showing briefringence indicating a high degree of molecular order.

In various applications, the copolymer is not heated to its crystalline melting point until it is to be shaped to a final form such as in extrusion of containers. Then, when the copolymer is heated and extruded to form a container, the shape of the extruded article is maintained after formation due to the rapid crystallization of the copolymer during cooling. If the copolymer is heated to more than 30° C. over the crystalline melting point, the copolymer loses its property of rapid crystallization.

The vinylidene chloride-acrylonitrile resins of this invention may further contain stabilizer materials. Suitable stabilizers include organometallic compounds such as known organometallic compounds of cadmium and tin and orthoester compounds such as ethylorthoformate, ethylorthoacetate, ethylorthobenzoate, poly(glycerylorthoacetate), poly(glycerylorthoformate), poly(glycerylorthopropionate) and similar orthoesters.

The following examples are set out to further amplify the invention.

EXAMPLE I

A reaction vessel equipped with a stirrer, reflux condenser, heating mantle and a dropping funnel is assembled. 2 g. of Dry Ice is added, along with 2 g. of ammonium nitrato cerate, 4 g. of sodium lauryl sulfate in 200 g. of water and 10 g. of 1,4-cyclohexane dimethanol. A monomer mixture of 94.3 g. vinylidene chloride and 5.7 g. acrylonitrile is added, using the dropping funnel, and the temperature of the reaction vessel raised to 30° C.–35° C. The added monomers solubilize, and the reaction mixture refluxes at 30° C.–35° C. After 1 hour, the heating mantle is removed, the copolymerization reaction being exothermic and providing the necessary heat. When reflux ceases, reaction is complete and the copolymer is separated by decantation, washed with water and dried. The dried copolymer shows some birefringence. The copolymer has a melting point in the range of 140° C. On heating to the melt and cooling at 12° C./min., there is birefringence at 130° C., indicating crystallization which increases on further cooling to room temperature. Elemental analysis of the copolymer for chlorine and cyanide yields a vinylidene chloride content of 91.4 percent with the remainder being 7.9 percent acrylonitrile and trace amounts of diol.

EXAMPLE II

The same apparatus and reactant mixture is used as in Example I except that 2.5 g. of ammonium nitrato cerate and 12.5 g. of 1,4-cyclohexane dimethanol is added. The copolymer has a melting point in the range of 145° C. On heating to the melt and cooling at 12° C./min. there is birefringence at 132° C., indicating crystallization which increases on further cooling to room temperature. Elemental analysis of the copolymer for chlorine and cyanide yields a vinylidene chloride concentration of 93.1 percent, with the remainder being 6.1 percent acrylonitrile and trace amounts of diol.

EXAMPLE III

A reaction vessel equipped with a stirrer, reflux condenser heating mantle and a dropping funnel is assembled 2 g. of Dry Ice is added, along with 2 g. of ammonium nitrato cerate, 4 g. of sodium lauryl sulfate in 200 g. of water and 10 g. of 1,4-cyclohexane dimethanol. A monomer mixture of 85 g. vinylidene chloride and 15 g. acrylonitrile is added, using the dropping funnel, and the temperature of the reaction vessel raised to 24° C.–31.5° C. The added monomers solubilize and the reaction mixture refluxes with the reflux temperature rising to 31.5° C. The temperature is maintained at 31.5° C. until reflux ceases. When reflux ceases, reaction is complete, and the copolymer is separated by decantation, washed with water and dried. The dried copolymer shows some birefringence. The copolymer melts at 159° C., and on cooling from the melt at 11° C./min., shows birefringence at 148° C., which increases with rapid crystallization on further cooling. Elemental analysis of the copolymer for chlorine gives a vinylidene chloride content of 83.7 percent, with the remainder being acrylonitrile and trace amounts of diol.

EXAMPLE IV

A reaction vessel equipped with a stirrer, reflux condenser, heating mantle and a dropping funnel is assembled. 2 g. of Dry Ice is added, along with 2 g. of ammonium nitrato cerate, 4 g. of sodium lauryl sulfate in 200 g. of water and 10 g. of 1,6-hexanediol. A monomer mixture of 90 g. vinylidene chloride and 10 g. acrylonitrile is added, using the dropping funnel, and the temperature of the reaction vessel raised to 30° C.–35° C. The added monomers solubilize, and the reaction mixture refluxes at 26–31° C. Heating is continued, and the temperature maintained at about 31° C. When reaction is complete, the copolymer is separated by decantation, washed with water and dried. The dried copolymer shows some brifringence. The copolymer melts at 135° C. and on cooling from the melt at 10° C./min. shows birefringence at 122° C., which increases with rapid crystallization on further cooling. Elemental analysis of the copolymer for chlorine gives a vinylidene chloride content of 91 percent with the remainder acrylonitrile and trace amounts of diol.

EXAMPLE V

A reaction vessel equipped with a stirrer, reflux condenser, heating mantle and a dropping funnel is assembled. 2 g. of Dry Ice is added, along with 2 g. of ammonium nitrato cerate, 4 g. of sodium lauryl sulfate in 200 g. of water and 12 g. of dipropylene glycol. A monomer mixture of 93 g. vinylidene chloride and 7 g. acrylonitrile is added, using the dropping funnel, and the temperature of the reaction vessel raised to 30° C.–35° C. The added monomers solubilize, and the reaction mixture refluxes at 30° C.–35° C. After one hour, the heating mantle is removed, the copolymerization reaction being exothermic and providing the necessary heat. When reflux ceases, reaction is complete, and the copolymer is separated by decantation, washed with water and dried. The dried copolymer shows some birefringence. The copolymer melts at 135° C., and on cooling from the melt at 10° C./min. shows birefringence at 126° C., which increases with rapid crystallization on further cooling to room temperature. The vinylidene chloride content is 91.2 percent, with the remainder being acrylonitrile and trace amounts of diol.

EXAMPLE VI

A reaction vessel equipped with a stirrer, reflux condenser, heating mantle and dropping funnel is assembled. A first solution containing 85 g. vinylidene chloride, 15 g. acrylonitrile and 1.5 g. azobis isobutyronitrile is prepared. A second solution containing 200 g. water, .5 g. sodium chloride, .5 g. polyvinyl alcohol emulsifier and .25 g. of magnesium sulfate is prepared. The second solution is added to the reaction vessel, and the vessel is purged with argon. The first solution is added, forming a suspension, and the vessel is heated to 58° C.–62° C. Heating is continued for 20 hours. The liquid is decanted, and the chunks of polymer are washed with water. The polymer is dried and is calculated to yield a monomer conversion of 89 percent. The dried polymer shows no birefringence. On heating to liquid state and cooling, the polymer is non-crystallizing.

EXAMPLE VII

A reaction vessel equipped with a stirrer, reflux condenser, heating mantle and a dropping funnel is assembled. 2 g. of Dry Ice is added, along with 2 g. of ammonium nitrato cerate, 4 g. of sodium lauryl sulfate in 200 g. of water, and 10 g. of 1,4-cyclohexane dimethanol. A monomer mixture of 80 g. vinylidene chloride and 20 g. acrylonitrile is added, using the dropping funnel, and the temperature of the reaction vessel raised to 30° C.–35° C. The added monomers solubilize, and the reaction mixture refluxes at 30° C.–35° C. The temperature is maintained at 30° C.–35° C. until reflux ceases. When reflux ceases, reaction is complete and the copolymer is separated by decantation, washed with water and dried. The copolymer melts at 130–135° C. and, on cooling at 10° C./min., shows birefringence at 115° C. Further cooling to room temperature produces rapid crystallization.

EXAMPLES VIII–XIII

The same apparatus as in Example I is used. The concentration of monomer mixture is 94.3 weight percent vinylidene chloride and 5.7 weight percent acrylonitrile. This mixture is added to the reaction vessel containing 2 g. Dry Ice, 4 g. of sodium lauryl sulfate and 200 g. of water. 10 g. of organic alcohol and 2 g. of ceric salt are added according to the following table:

| Example | Ceric salt | Organic alcohol | Percent conversion |
|---------|------------|-----------------|--------------------|
| VIII | Ammonium nitrato cerate $(NH_4)_2Ce(NO_3)_6$. | 1,3-propylene glycol. | 63.5 |
| IX | Ammonium nitrato cerate. | Diethylene glycol. | 60 |
| X | Potassium nitrato cerate $K_2Ce(NO_3)_6$. | 1,4-cyclohexane dimethanol. | 81 |
| XI | Ammonium nitrato cerate. | Glycerol. | 50.5 |
| XII | Ceric iodate $(Ce(IO_3)_4)$. | 1,4-cyclohexane dimethanol. | 53 |
| XIII | Nitrato ceric acid $H_2Ce(NO_3)_6$. | ...do... | 45 |

The copolymers of Examples VIII–XIII are in a melt condition from 115° C. to 150° C., and on cooling from the melt show birefringence in the range of from 8° C. to 15° C. below the melting point. Continued cooling from the melt at a 10° C./min. rate yields rapidly crystallizing copolymers. The conversion percent sets out the degree of conversion of the monomers to the copolymer. The copolymers on elemental analysis for chlorine and cyanide yield a vinylidene chloride content of from 92.3 percent to 94.8 percent, and an acrylonitrile content of from 6.8 percent to 4.9 percent, with traces of alcohol present in the copolymer.

What is claimed is:

1. The method of producing rapidly crystallizing vinylidene chloride-acrylonitrile copolymers comprising copolymerizing a monomer mixture of about 80 to 95 percent vinylidene chloride monomer and 5 to 20 percent acrylonitrile monomer using a ceric salt and alcohol as the initiator to form a copolymer, and heating said copolymer to a temperature in the range of the crystalline melting point followed by cooling whereby said copolymer rapidly crystallizes.

2. The method of claim 1 wherein said monomer mixture contains about 5 percent to about 15 percent acrylonitrile monomer and 85 percent to 95 percent vinylidene chloride monomer.

3. The method of claim 1 wherein said polymerizing comprises aqueous emulsion polymerization.

4. The method of claim 1 wherein said ceric salt is selected from the group consisting of potassium nitrato cerate, ammonium nitrato cerate, nitrato ceric acid, ammonium sulfato cerate and ceric iodate.

5. The method of claim 4 wherein said alcohol is a diol which is selected from the group consisting of 1,4-cyclohexanedimethanol, 1,6-hexanediol, ethylene glycol, 1,3-propylene glycol, diethylene glycol and dipropylene glycol.

6. The method of claim 1 wherein said alcohol is selected from the group consisting of 1,4-cyclohexanedimethanol, 1,6-hexanediol, 1,3-propylene glycol, diethylene glycol, dipropylene glycol, glycerol, cyclohexanol and cyclohexane methanol.

7. The method of claim 1 wherein said ceric salt is ammonium nitrato cerate and said alcohol is selected from the group consisting of 1,4-cyclohexanedimethanol, 1,6-hexanediol, 1,3-propylene glycol, diethylene glycol, dipropylene glycol and glycerol.

8. The method of claim 1 wherein said ceric salt is potassium nitrato cerate and said alcohol is selected from the group consisting of 1,4-cyclohexanedimethanol, 1,6-hexanediol, 1,3-propylene glycol, diethylene glycol, dipropylene glycol and glycerol.

9. The method as in claim 1 wherein said temperature exceeds the crystalline melting point of said copolymer by less than 30° C.

10. The method as in claim 1 wherein said copolymerizing is conducted in a substantially oxygen free atmosphere.

References Cited

UNITED STATES PATENTS

| | | | |
|---|---|---|---|
| 2,238,020 | 4/1941 | Hanson et al. | 260—85.5 X |
| 2,606,894 | 8/1952 | Pitzl | 260—85.5 R |
| 2,614,092 | 10/1952 | Reilly | 260—85.5 X |
| 2,968,651 | 1/1961 | Friedrich et al. | 260—85.5 X |
| 3,226,370 | 12/1965 | Poindexter | 260—85.5 X |
| 3,328,330 | 6/1967 | Triofimow et al. | 260—85.5 X |
| 2,922,768 | 1/1960 | Mino et al. | 260—85.5 M |
| 3,502,630 | 3/1970 | Borsini et al. | 260—85.5 M |
| 2,587,465 | 2/1952 | Ham et al. | 260—85.5 N |
| 2,895,938 | 7/1959 | Ohlinger et al. | 260—85.5 N |

HARRY WONG, JR., Primary Examiner

U.S. Cl. X.R.

260—45.75, 45.85, 86.3, 87.1, 87.7, 91.7, 20.00